United States Patent [19]

Hasebe

[11] Patent Number: 4,899,075

[45] Date of Patent: Feb. 6, 1990

[54] TWO-PHASE DC BRUSHLESS MOTOR

[75] Inventor: Yoichi Hasebe, Saku, Japan

[73] Assignee: Shinano Kenshi Kabushiki Kaisha, Japan

[21] Appl. No.: 282,924

[22] Filed: Dec. 7, 1988

Related U.S. Application Data

[63] Continuation-in-part of Ser. No. 128,090, Dec. 3, 1987, abandoned.

[51] Int. Cl.[4] .................................... H02K 1/14

[52] U.S. Cl. ...................... 310/257; 310/68 B; 310/193

[58] Field of Search .............. 310/49 R, 67 R, 68 R, 310/68 B, 156, 193, 257

[56] References Cited

U.S. PATENT DOCUMENTS

| | | | |
|---|---|---|---|
| 3,508,091 | 4/1970 | Kavanaugh | 310/257 |
| 4,318,018 | 3/1982 | Kennedy | 310/257 |
| 4,506,182 | 3/1985 | Rohdin | 310/193 |
| 4,728,833 | 3/1988 | Shiraki et al. | 310/68 R |
| 4,794,292 | 12/1988 | Torisawa | 310/257 |

FOREIGN PATENT DOCUMENTS

| | | | |
|---|---|---|---|
| 3006207 | 8/1981 | Fed. Rep. of Germany | 310/257 |

*Primary Examiner*—Patrick R. Salce
*Assistant Examiner*—Judson H. Jones
*Attorney, Agent, or Firm*—Bruce L. Adams; Van C. Wilks

[57] ABSTRACT

A two-phase DC brushless motor comprising a stator wherein a pair of stator cores having a plurality of salient poles on a stator yoke mounted on a mounting base plate and a coil body are provided so that the coil body is positioned between the pair of stator cores and the salient poles of the pair of stator cores are angularly spaced at an electric angle of 180° from each other, and a rotor provided with a permanent magnet having N and S poles arranged in the number equal to that of the salient poles of the pair of stator cores in a circumferential direction so as to oppose to the salient poles leaving a slight gap therebetween, wherein each of the salient poles is shaped to have a notched portion in one of opposite corners, in a direction of rotation of the rotor, of the outer end of the salient pole, and further comprising a position detection unit opposed to the permanent magnet for detecting a rotational position of the rotor to switch an energizing direction relative to the coil body.

16 Claims, 2 Drawing Sheets

10a
10
10b
11
6d
3
9
8
6c
5a
6a
5d
15
-16
12
5
6b
14
13
6
16
7
2
5b
2
5c
4
1

FIG. 1
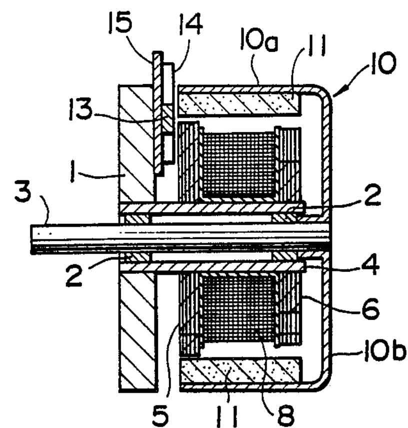
FIG. 2a
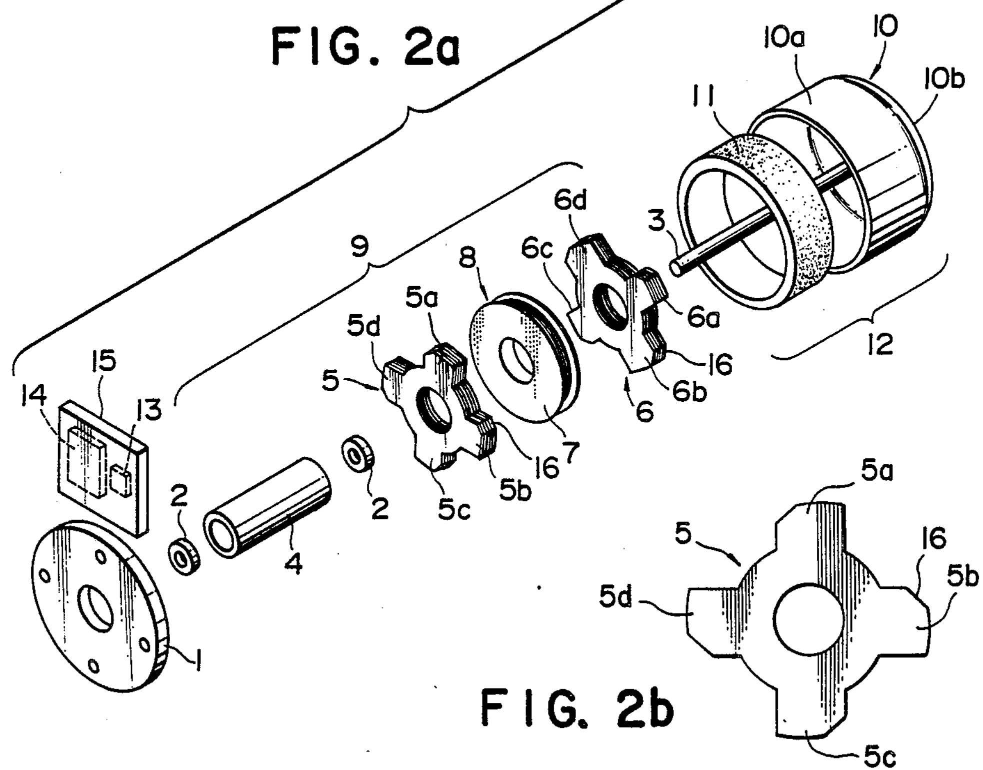
FIG. 2b

TWO-PHASE DC BRUSHLESS MOTOR

This is a Rule 62 continuation-in-part application of parent application Ser. No. 128,090 filed Dec. 3, 1987, now abandoned.

FIELD OF THE INVENTION

The present invention relates to a two-phase DC brushless motor usable, for example, for small type blowers or the like which are relatively small in output.

DESCRIPTION OF THE PRIOR ART

In the past, a brushless motor of this kind comprised a rotor magnetized to a multipole and a stator in which two-phase or three-phase coils are formed about salient poles, where a rotational position of the rotor is detected and an energizing direction relative to the coil is successively switched to thereby obtain a turning force in the same direction.

However, in the conventional brushless motor, the operation for coil winding about each of the salient poles is extremely cumbersome. Particularly, in motors having many salient poles or in motor of small size, the coil winding operation is more cumbersome. Also in motors having a two-phase winding, they have a dead point in a normal torque for their rotations and therefore the motors sometimes are not started or rotated. To avoid this, various improvements have been empolyed wherein an interpole is provided on a stator, wherein permanent magnetic poles spaced with uneven pitch are provided on a stator, and wherein the number of poles are varied in two stages. However, any of the above-described improvements have disadvantages in that the manufacture of such improved motors is complicated and expensive and the motor efficiency is deteriorated. Furthermore, in a motor having a three-phase winding, it has no dead point of torque and therefore will never fail to start to rotate by energization. But in this case, the winding process for the stator, the detection of a rotational position of the rotor and the commutation means of the coil are complicated, and in addition, the motor and its circuit structure are higher in cost.

SUMMARY OF THE INVENTION

In view of the foregoing, for overcoming the disadvantages noted above with respect to prior art, the present invention provides an improvement by which any operation for coil winding about salient poles of a stator is omitted to simplify motor manufacturing so that a small and inexpensive motor may be obtained; a dead point of starting torque inherent in a two-phase motor as a weak point is avoided by making each of the salient poles unsymmetric in shape with respect to a permanent magnetic pole facing said salient pole to provide a stability of starting the motor; and a multipole motor may be easily obtained. It is therefore a principal object of the present invention to provide a two-phase DC brushless motor comprising a stator in which a pair of stator cores having a plurality of salient poles on a stator yoke mounted on a mounting base plate and a coil body are provided so that said coil body is positioned between said pair of stator cores and said salient poles of said pair of stator cores are angularly spaced at an electric angle of 180° from each other, and a rotor provided with annular permanent magnet having N and S poles alternately spaced and equal in number to all of the salient poles of said pair of stator cores and arranged in a circumferential direction so as to oppose of all said salient poles leaving a slight gap therebetween, wherein each of said salient poles has a notched portion in one of opposite corners, in a direction of rotation of said rotor, of the protruded end of said salient poly whereby said salient pole is made unsymmetric in shape with respect to said permanent magnetic pole being just opposed thereto, and further comprising a position detection means opposed to said permanent magnet for detecting a rotational position of the rotor to switch an energizing direction relative to said coil body.

According to a further aspect of the present invention, a pair of stator cores and a coil body are provided on the outer periphery of a tubular stator yoke, a rotational shaft is coaxially rotatably supported in and through said stator yoke, a pot-shaped rotor yoke is mounted on one end of said shaft so as to encircle the outer periphery of the stator, and a permanent magnet is provided on the inner peripheral surface of said rotor yoke.

According to another aspect of the present invention, each of the stator cores has four angularly equidistant salient poles, and the permanent magnet has eight angularly equidistant poles.

According to another aspect of the present invention, the stator core is formed from a laminated steel plate.

BRIEF DESCRIPTION OF THE DRAWINGS

An embodiment of a two-phase DC brushless motor according to the present invention is shown in the accompanying drawings, in which:

FIG. 1 is a side sectional view of a two-phase DC brushless motor;

Figure 3:
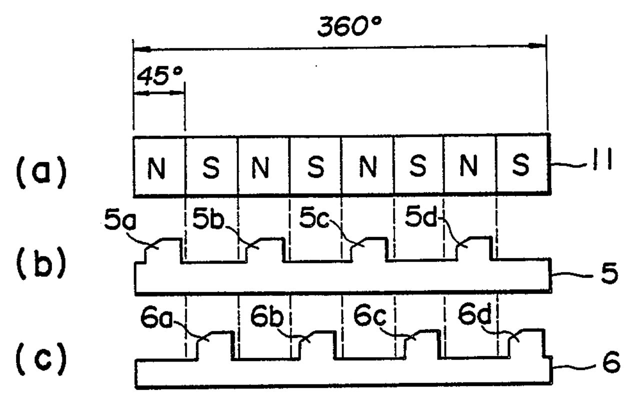

FIG. *2a* is an exploded perspective view;

FIG. *2b* is an elevational view of a stator core;

FIG. 3 is an developed view showing the relationship between N and S poles of a permanent magnet and salient poles of a stator; and FIGS. *4a* and *4b* are respectively distribution views of torque.

DESCRIPTION OF THE PREFERRED EMBODIMENTS

FIG. 1 is a sectional view showing an embodiment of a two-phase DC brushless motor; and FIG. *2a* is an exploded perspective view thereof. Secured to a mounting base plate 1 is one end of a tubular stator yoke 4 into which a rotatary shaft 3 is coaxially rotatably inserted through bearings 2 interposed therebetween. The stator yoke 4 has a plurality of salient poles in the outer periphery thereof. In the present invention, a stator core 5 formed from a laminated steel plate having four salient poles *5a* to *5d*, a stator core 6 formed from a laminated steel plate likewise having four salient poles *6a* to *6d*, and a coil body 8 formed by coil winding around about a bobbin 7 are secured so that said coil body 8 is positioned between said pair of stator cores 5 and 6 and the salient poles of the pair of stator cores 5, 6 are angularly spaced at an electric angle of 180° and at a mechanical angle of 45° from each other, these elements constituting a stator 9. One end of the rotational shaft 3 protrudes outwardly from the mounting base plate 1 to constitute an output shaft, and to the other end thereof is secured a central portion of a side plate **10*b* of a pot-like shaped rotor yoke 10 a cylindrical portion 10*a* of a rotor yoke 10 so as to oppose said stator 9, and a ring-like permanent magnet 11 with eight poles magnetized thicknesswise and spaced alternately north and south at a 45° pitch of a mechanical angle is secured to the inner peripheral surface of the cylindrical porion 10***a* of said rotor yoke 10 so as to leave a slight gap relative to the outer peripheral surface of said stator 9, these elements constituting a rotor 12. As shown in FIG. 2*b*, each of the salient poles 5*a* to 5*d* (and 6*a* to 6*d*) is shaped in a plate-like form and has an obliquely notched portion 16 formed in one of opposite corners, in a direction of rotation of the rotor 12, of the outer end of said salient pole and oriented so as to be next to the unnotched corner of the salient pole adjacent to said salient pole. Further, in this embodiment, all of said outer ends and all of said notched portions 16 are of substantially equal angular widths which are measured on the basis of the central axis of the stator yoke 4, respectively. A position detection element 13 comprising a Hall element for detecting a rotational position of the rotor 12 and a commutation means 14 for switching an energizing direction relative to the coil body 8 by said position detection element 13 are disposed on a printed substrate 15 provided on the inner surface of said mounting base plate 1.

FIG. 3 is a developed view showing a relationship between the above-structured salient poles 5*a* to 5*d* and 6*a* to 6*d* of the pair of stator cores 5 and 6 and the array of the poles of the permanent magnet 11 of the rotor 12. The salient poles 5*a* to 5*d* and the other salient poles 6*a* to 6*d* are relatively changed in their polarity with switching an energizing direction relative to the coil body 8, the energizing direction being changed every $\pi/4$-period by the position detection element.

Figure 4A:
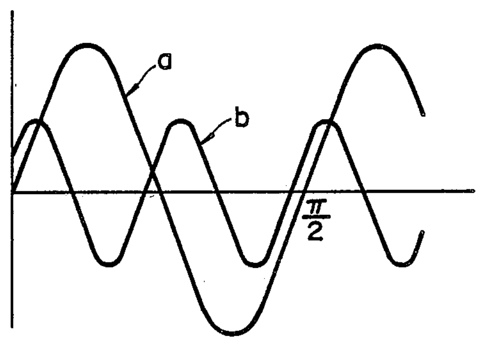
Figure 4B:
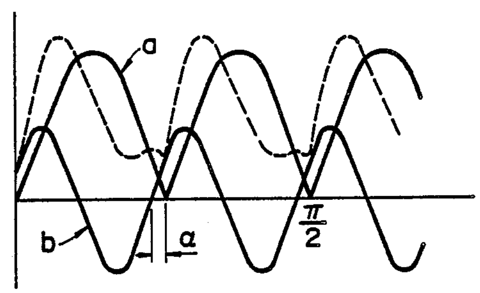

FIGS. 4*a* and 4*b* show torque distributions. As shown in FIG. 4*a*, the torque distribution can be considered such that it is divided into a torque generated when the stator is energized, namely, a fundamental wave torque a, and a torque generated only by the permanent magnet 11 of the rotor 12 when the stator is out of energization, namely, a second higher harmonic torque b.

In the practice of the motor actual, the energizing direction relative to the coil body 8 is reversed with every $\pi/4$-period as previously mentioned, the fundamental wave torque repeatedly changes in the same direction every $\pi/4$-period, as shown in FIG. 4*b*. Accordingly, the torque distribution caused by the excitation of the stator 9 comprises a combination of the aforesaid fundamental wave torque a as indicated by a broken line, and the second higher harmonic torque b, whereby the rotor 12 rotates.

On the other hand, if in the above motor each of the salient poles 5*a*–5*d* and 6*a*–6*d* is modified (A) to have no such notched portion so that the whole surface of the outer end thereof is opposed to the inner surface of the permanent magnet 11 with an equal gap distance therebetween or (B) to form two notched portions having substantially equal dimensions in the respective opposite corners of the outer end of the salient pole so that the two notched portions are symmetrical with respect to a geometrical central line of the salient pole, the fundamental wave torque a and the second higher harmonic torque b have a same position, at which their torque levels are zero, every $\pi/4$ period on the co-ordinate axis of phase angle or relative angular displacement of the rotor, that is, value of $\alpha$ indicated in FIG. 4*b* becomes zero. Such result may be attributed to the fact that in each of the salient poles, a central line of magnetization by the permanent magnetic pole being just opposed to said salient pole for generating the second higher harmonic torque b lies on a central line of magnetization by the coil 8 for generating the fundamental torque a. Consequently, in contrast to the motor according to the present invention, such modified motor has the aforesaid dead point.

In the embodiment of the present invention, the case where eight poles are disposed alternately north and south on the rotor 12 has been described but the number of poles is not limited to the above-described arrangement. Furthermore, in increasing the number of permanent magnetic poles, the coil body 8 remains unchanged but only the total number of salient poles of the pair of stator cores is selected to be equal to all of the permanent magnetic poles, whereby a multipole motor may be obtained.

Furthermore, while in the above-described embodiment, the stator is surrounded by the rotor yoke and the salient poles of the stator core are opposed to the inner peripheral surface of the ring-like permanent magnet, it is of course noted that the salient poles of the stator core may be opposed to the outer periphery of the permanent magnet.

As described above, in the brushless motor according to the present invention, it is not necessary to form a coil around each of the salient poles, and therefore it can provide advantages that the structure and fabrication of the motor are very simple and can be obtained at lower cost. Moreover, the present invention has various other advantages in that the motor can be miniaturized; that a multipole motor may be easily constructed without changing the number of windings of the coil; since the motor is of a two-phase type, the driving system is simple and the position detection element, commutation circuit, etc. can be reduced in size; and by providing a notched portion in one of opposite corners of the outer end of each of the salient poles, the phase angle position of zero torque level with respect to the fundamental wave torque a does not coincide with that of zero torque level with respect to the second higher harmonic torque b, and thus, starting of the motor is easy when a power source is turned on.

While the invention has been particularly shown and described with reference to a preferred embodiment, it will be understood by those skilled in the art that the foregoing and other changes in form and detail may be made therein without departing from the spirit and scope of the invention.

What is claimed is:

1. A brushless motor comprising:

a cylindrical bobbin-wound coil coaxially mounted on a stator axis and energized in two-phase mode;

first and second annular stator discs coaxially mounted on said stator axis with said coil therebetween;

first and second sets of substantially equally spaced stator poles projecting in a plate-like form and perpendicular to said stator axis from the outer peripheral edges of said first and second stator discs, respectively, said first and second sets of stator poles having protruding ends lying in a common imaginary cylindrical surface and magnetically linked to said coil by the respective one of said first and second stator discs, said stator poles of said first set being equal in number to and angularly spaced approximately 180° electrically from said stator poles of said second set, each stator pole of said first and second sets having a notched portion formed in one of opposite corners of said protruded end thereof and oriented so as to be next to the unnotched corner of said stator pole adjacent thereto;

a rotor coaxially rotatable relative to said stator axis and having permanent magnetic poles equal in number to all of said stator poles and spaced alternately north and south and circumferentially arranged on a cylindrical flange of said rotor to overlap all of said stator poles with a slight annular gap therebetween, each of said permanent magnetic poles having an angular width substantially equal to the sum of angular widths of said protruded end and said notched portion of said stator pole; and position detecting means opposed to said permanent magnetic poles with a gap left therebetween for detecting the position and polarity of said magnetic pole to thereby switch a direction of direct current charged to said coil.

2. A brushless motor according to claim 1, wherein said notched portion of said stator pole has an edge linearly inclined toward one of opposite sides of said stator pole.

3. A brushless motor according to claim 1, wherein all of said protruded ends of said stator poles are substantially equal angularly widths.

4. A brushless motor according to claim 1, wherein all of said notched portions of said stator poles are of substantially equal angular widths.

5. A brushless motor according to claim 1, wherein said position detecting means comprises a Hall element.

6. A brushless motor according to claim 1, wherein all of said protruded ends of said stator poles are of substantially equal angular widths.

7. A brushless motor according to claim 2, wherein all of said notched portions of said stator poles are of substantially equal angular widths.

8. A brushless motor according to claim 2, wherein said position detecting means comprises a Hall element.

9. A brushless motor comprising:

a stator having a stator axis and comprising a cylindrical bobbin-wound coil coaxially mounted on the stator axis and energized in two-phase mode and first and second annular stator discs coaxially mounted on said stator axis with said coil therebetween and having first and second sets of substantially equally spaced stator poles projecting from the outer peripheral edges of said stator discs and with ends lying in a common imaginary cylindrical surface, said stator poles of said first set being equal in number to and angularly spaced approximately 180° electrically from said stator poles of said second set, each stator pole of said first and second sets having a notched portion formed in one of opposite corners of said protruded end thereof and oriented so as to be next to the unnotched corner of said stator pole adjacent thereto;

a rotor coaxially rotatable relative to said stator axis and having permanent magnetic poles equal in number to all of said stator poles and spaced alternately north and south and circumferentially arranged to overlap all of said stator poles with a slight annular gap therebetween; and position detecting means opposite to said permanent magnetic poles with a gap left therebetween for detecting the position and polarity of said magnetic pole to thereby switch a direction of direct current charged to said coil.

10. A brushless motor according to claim 9, wherein said notched portion of said stator pole has an edge linearly inclined toward one of opposite sides of said stator pole.

11. A brushless motor according to claim 9, wherein all of said protruded ends of said stator poles are substantially equal angularly widths.

12. A brushless motor according to claim 9, wherein all of said notched portions of said stator poles are of substantially equal angular widths.

13. A brushless motor according to claim 9, wherein said position detecting means comprises a Hall element.

14. A brushless motor according to claim 10, wherein all of said protruded ends of said stator poles are of substantially equal angular widths.

15. A brushless motor according to claim 10, wherein all of said notched portions of said stator poles are of substantially equal angular widths.

16. A brushless motor according to claim 10, wherein said position detecting means comprises a Hall element.

* * * * *